United States Patent [19]
Wyatt

[11] 3,980,251
[45] Sept. 14, 1976

[54] APPARATUS FOR CHANGING THREAD SPACING

[76] Inventor: Dickie R. Wyatt, 1585 Greenbay Road, Highland Park, Ill. 60035

[22] Filed: July 23, 1973

[21] Appl. No.: 381,784

[52] U.S. Cl. .............................. 242/157 R; 28/55; 226/199
[51] Int. Cl.² ........................................ B65H 57/16
[58] Field of Search............. 28/54, 55, 31; 19/65 T; 226/196, 199; 242/157 R; 57/90

[56] References Cited
UNITED STATES PATENTS

| | | | |
|---|---|---|---|
| 2,386,689 | 10/1945 | Kaufmann............................... | 28/54 |
| 2,680,280 | 6/1954 | White ..................................... | 28/31 |
| 2,690,313 | 9/1954 | McDermott..................... | 242/157 R |
| 2,886,879 | 5/1959 | Gummi................................... | 28/55 |
| 2,896,879 | 7/1959 | Vandenburgh.................. | 242/157 R |
| 2,924,002 | 2/1960 | Ibbs ....................................... | 28/55 |
| 3,130,453 | 4/1964 | Haigler, Jr........................... | 19/65 T |
| 3,543,984 | 12/1970 | Mansfield ........................... | 226/196 |
| 3,851,698 | 12/1974 | Leach et al. ......................... | 57/90 X |

*Primary Examiner*—Robert R. Mackey
*Attorney, Agent, or Firm*—Hume, Clement, Brinks, Willian, Olds & Cook, Ltd.

[57] ABSTRACT

An apparatus for either increasing or decreasing the spacing between threads to facilitate the threading and unthreading of open ended combs. A plurality of vanes define converging passages for threads such that as the vanes are rotated the spacing between threads is either increased or decreased depending on the direction of rotation.

9 Claims, 4 Drawing Figures

U.S. Patent  Sept. 14, 1976  3,980,251
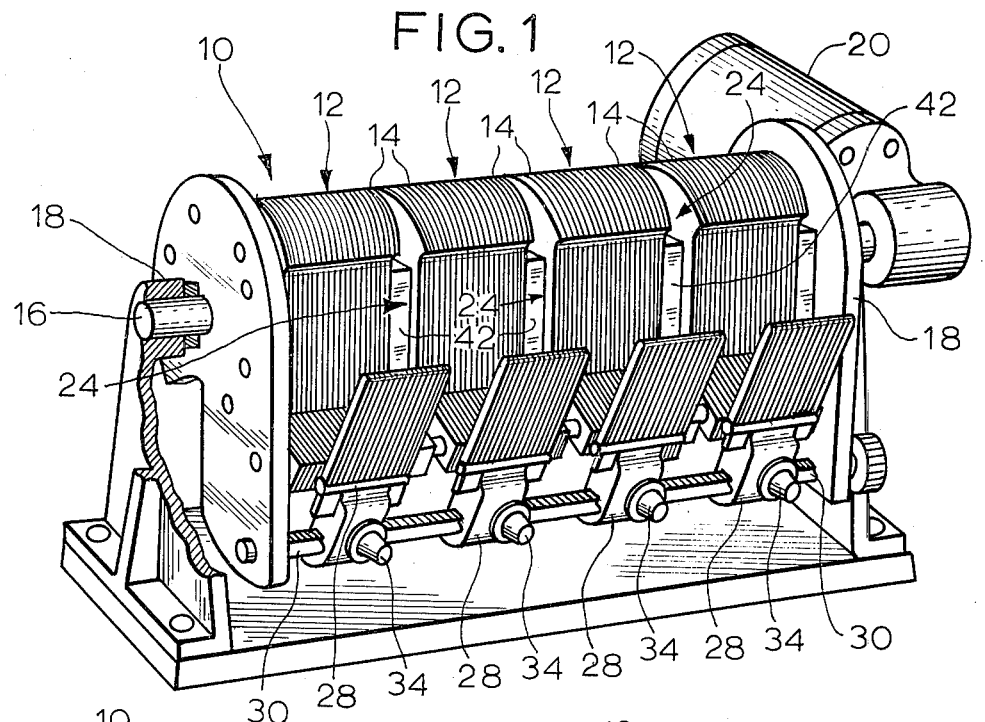
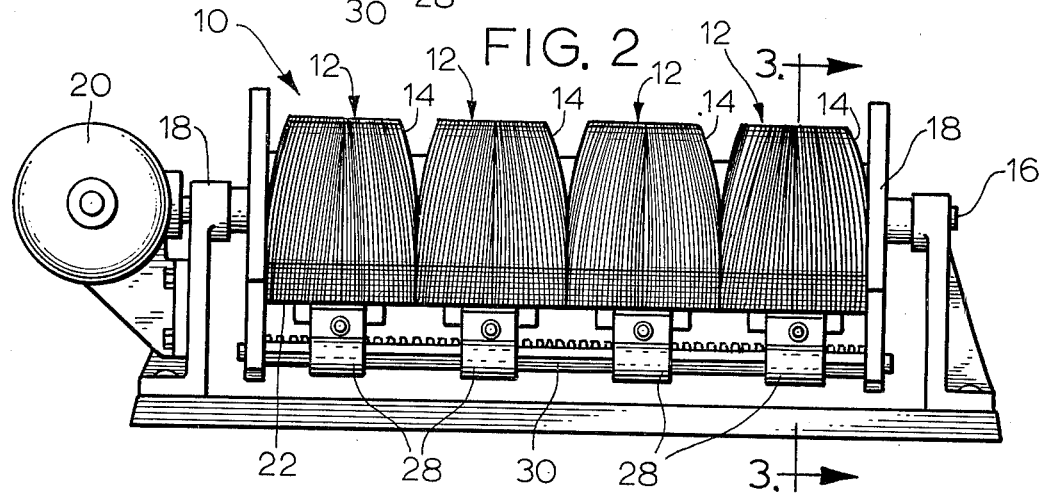
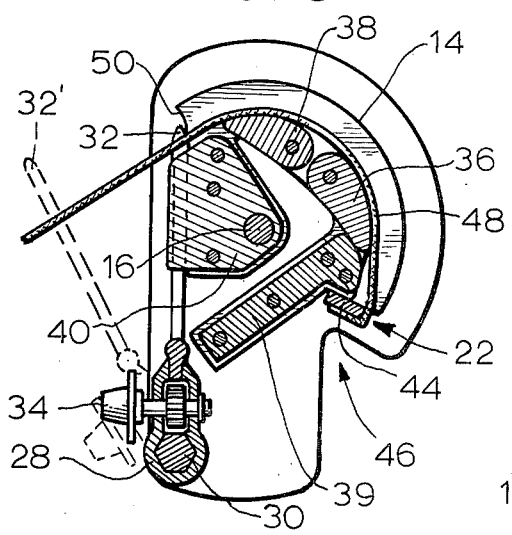
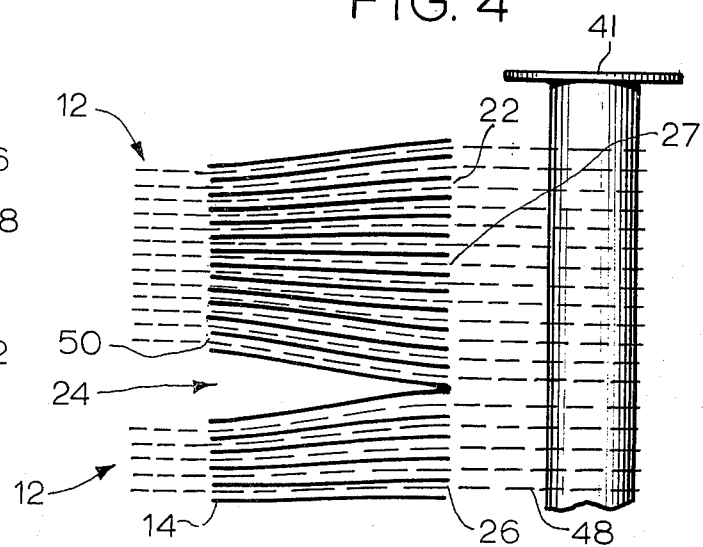

APPARATUS FOR CHANGING THREAD SPACING

BACKGROUND OF THE INVENTION

This invention relates to the textile industry and the thread handling art and more specifically to an apparatus and method for facilitating the threading and unthreading of open ended combs.

Normally, threads are supplied on large bobbins at standard spacings. In many applications the standard spacing at which the threads are provided is not the same as that used in the machinery to make the final product. For example, the threads may be provided by the mill at 16 threads per inch and the manufacturing apparatus may receive the threads at a spacing of 20 per inch.

When the threads are to be placed in open ended combs which have either a smaller or larger spacing than the standard, it has been necessary to thread the combs by hand. One specific example is in the tape making industry where threads are incorporated into the tape. In this specific example, the thread spacing in the tape is smaller than that at which the threads are supplied by the mill. It has been necessary for the open ended combs used by the tape making machinery to be hand threaded. This is an extremely time consuming process as the threads are very small and the comb spacing, which may be on the order of 20 threads per inch, is very small and consequently the threading operation significantly increases the down time of the tape making machinery.

Aside from this specific example in the tape making industry, there are many textile applications in which open ended combs are used. In these applications the same difficulty with respect to hand threading the open ended combs exist.

SUMMARY OF THE INVENTION

This invention presents an apparatus and method for changing the thread spacing of the threads as provided by the mill. It may be used either to thread open ended combs or to unthread the comb to return the threads to any desired spacing. The apparatus includes a plurality of vanes on a rotatably mounted shaft. As used herein the terms rotatably, rotate, rotatable, and rotating comprehend movement about an axis through any arc whether less than, equal to, or greater than 360°. The vanes define passages through which the threads may pass. The spacing of the vanes changes about the circumference of the mechanism. The central passage is straight and the passages on both sides of the central passage converge at a progressively greater angle. Thus, when the vanes are rotated threads contained in the passages will be moved either closer together or farther apart depending upon the direction of rotation.

The threads may be automatically placed in an open ended comb by the mechanism or alternatively, after the spacing has been changed to the same spacing as the open ended comb into which the threads are to be placed, the hand threading process may take place much more easily than if the thread spacings were different than that of the comb.

BRIEF DESCRIPTION OF THE DRAWINGS

The features of this invention will become more apparent as in the following detailed description read in conjunction with the figures in which:

FIG. 1 is a perspective view of a thread spacing changer constructed in accordance with the principles of this invention;

FIG. 2 is a rear view of the thread spacing changing mechanism illustrated in FIG. 1; FIG. 3 is a cross-sectional view taken along line 3—3 in FIG. 2; and FIG. 4 is a schematic illustration of the manner in which the thread spacing is changed as the changing mechanism is rotated.

DETAILED DESCRIPTION OF A PREFERRED EMBODIMENT

Referring now to the Figures in which like reference numerals indicate like parts, a thread spacing changing apparatus constructed in accordance with the principles of this invention is indicated generally at 10 in FIGS. 1 and 2. The thread spacing changer 10 includes four segments 12, each of which includes a plurality of vanes 14. The segments 12 are mounted to a rotatably mounted shaft 16 which is journalled in a housing 18. A motor 20 may be provided to rotate the segments 12 or they may be rotated by hand whichever is preferable in a given application. As is apparent in comparing FIGS. 1 and 2 the spacing between the vanes 14 changes about the circumference of the segments 12. It will be noted in FIG. 2 the segments 12 are in contact at 22 and in FIG. 2 they are separated by spacers 24. Thus the vanes 14 and consequently the passages between them become narrower as one moves from point 22 around the circumference of the segments 12. This may be visualized in FIG. 4 where the vanes 14 and the spaces 26 between the vanes 14 are more clearly illustrated. FIG. 4 is a projection of the segments 12. The vanes 14 are in contact at point 22 and the space 24 between segments becomes progressively larger about the circumference of the segments 12. This is because the vanes 14 are disposed at a progressively greater angle to the straight central passage 27.

It is desirable to space the vanes 14 at the standard bobbin spacing at point 22 and to have the spacing progressively decrease to the desired spacing of the open ended comb into which the threads are to be placed. To facilitate the threading operation, a plurality of open ended combs 28 may be provided on the spacing changing device 10. The segmented combs 28 may be mounted rotatably on a shaft 30 such that they can nest between spacers 40 in alignment with the vanes 14 as shown in FIG. 3 in solid lines by the dent 32. The comb segments 28 are movable horizontally along the shaft 30 by a rack and gear system operated by knobs 34. It may be desirable to be able to remove the segmented combs 28 after they have received the threads for placement into a permanent open ended comb and, if so, they may be removably mounted in any well known manner. Alternatively, the segments 28 may be moved together and rotated outwardly to a position such as shown in FIG. 3 at 32' and the segmented combs 28 may actually form the open ended comb for whatever operation is being performed.

Referring to FIG. 3, the segments 12 include a vane 14 which is disposed on a shaft 16. In between each of the vanes 14 are four spacing members 39, 36, 38 and 40, which decrease in thickness about the shaft 16. Consequently the spacing member 39 would have the greatest thickness and preferably would give a vane spacing equal to the standard spacing on the bobbins 41. Spacer member 36 is slightly thinner than 39 and spacer 38 is thinner than spacer 36. Spacer 40 is thinner than spacer 38 and spaces the vanes at the spacing to be used in the textile or tape operation. Obviously a plurality of spacers 39, 36, 38, 40 are not essential and one spacer of progressively changing thickness could be utilized. Because the effect of the decreasing thickness is cumulative throughout the segment 12, the large gaps 24 are formed between the segments 12. The large spacers 42 are placed in the gaps 24 to hold the segments 12 in their proper position. Referring now to the operation of the thread spacing changer 10, it is normal for the threads on a bobbin 41 to be taped at the standard spacing. The tape on the bobbin may be removed with the threads adhering thereto and the threads may be inserted in the passages 26 at 22. This may be easily accomplished by transferring the taped threads to an elongated rectangular bar 44 which is then placed in a notch 46 defined at point 22. The threads may be easily inserted between the vanes 14 at point 22 because of the passages 26 between the vanes 14 are at the same spacing as the threads on the bobbin 41. The threads 48 are drawn taut and the motor 20 may be activated to rotate the segments 12 through an arc of approximately 180 degrees. As the rotation takes place the threads progressively become closer together until they reach the end point 50 (FIG. 3). At the end point 50, the threads 48 are at the desired spacing and as illustrated in FIG. 3 are inserted into the segmented combs 28.

The threads in the segmented combs 28 may then be taped off on a member such as the bar 44 and taken to a fixed open ended comb at the same spacing. Obviously the threads will be cut off the original bar 44 so that they are their new spacing. Alternatively, the segmented combs 28 may be brought together and rotated outwardly to a position such as shown in FIG. 1 or at 32' in FIG. 3 and threaded into the machinery which is being utilized.

If it is desired to increase the spacing between threads the operation is reversed. That is, the threads 48 are initially threaded at what has been referred to as the end point 50 or at the position of narrowest spacing and the segments 12 are rotated in the opposite direction until the threads are at a greater spacing at point 22. The threads may then be taped off and transferred to any desired mechanism.

Obviously there are many modifications of this invention which will perform the desired results. The spacing changer 10 has been illustrated as a plurality of segments 12, but this has been done only because normally the width which must be accommodated will not permit the use of a single segment 12. There may be more or less segments 12 in any given application. It is also contemplated that when the threads are initially placed between the vanes 14 they need not be attached in the groove 46 but could be attached to some other member as long as they are under tension so that they remain in the passages 26 defined by the vanes 14.

What is claimed is:
1. A thread spacing changer comprising:
a plurality of rotatably mounted vanes;
spacing means positioned between said vanes, said spacing means being of progressively decreasing thickness;
said vanes and said spacing means defining passages for accommodating a plurality of threads;
said passages being of progressively decreasing thickness, thereby permitting the spacing between threads placed therein to be changed by rotating said rotatably mounted vanes; and means for intermittently rotating said mounted vanes to selectively adjust said thread spacing.
2. The thread spacing changer set forth in claim 1 including a plurality of segments of said rotatably mounted vanes.
3. The thread spacing changer set forth in claim 2 further comprising a plurality of open ended comb members disposed at the point of smallest thread spacing.
4. The thread spacing changer set forth in claim 3 wherein said comb members nest between said spacing means for alignment with said vanes.
5. The thread spacing changer set forth in claim 3 wherein said comb members are selectively rotatably mounted to said thread spacing changer and include means for changing the spacing between comb members.
6. The thread spacing changer set forth in claim 5 wherein said comb members are removably mounted to said thread spacing changer.
7. A comb threading device for threading at least one comb member comprising means for defining a plurality of passages for accommodating a plurality of threads;
said passages being so constructed that inlet portions accommodate a predetermined number of threads per inch, and outlet portions accommodate a greater number of threads per inch;
means for rotatably supporting said passage defining means such that said supporting means and plurality of threads are moveable relative to one another;
means for intermittently rotating said supporting means; and
means, including said outlet portions, for cooperating with said at least one comb member so that said plurality of passages are aligned with the spaces between the teeth of said comb member to assure threading of the comb member in response to relative movement of said supporting means and plurality of threads.
8. The combination of the comb threading device of claim 7 and a plurality of open ended comb members cooperatively associated with a corresponding plurality of passage defining means.
9. A comb threading device for threading at least one comb member comprising means for defining a plurality of passages for accommodating a plurality of threads;
said passages being so constructed that inlet portions accommodate a predetermined number of threads per inch, and outlet portions accommodate a greater number of threads per inch;
means for supporting said passage defining means such that said supporting means and plurality of threads are movable relative to one another;
means for effecting relative movement between said supporting means and said plurality of threads for moving said threads between said inlet and outlet portions; and
means, including said outlet portions, for cooperating with said at least one comb member so that said plurality of passages are aligned with the spaces between the teeth of said comb member to assure threading of the comb member in response to relative movement of said supporting means and plurality of threads.

* * * * *

UNITED STATES PATENT OFFICE
CERTIFICATE OF CORRECTION

Patent No. 3,980,251      Dated September 14, 1976

Inventor(s) Dickie R. Wyatt

It is certified that error appears in the above-identified patent and that said Letters Patent are hereby corrected as shown below:

Column 2, line 27, Fig. "2" should read -- Fig. 1 --.

Signed and Sealed this

First Day of February 1977

[SEAL]

Attest:

RUTH C. MASON
*Attesting Officer*

C. MARSHALL DANN
*Commissioner of Patents and Trademarks*